United States Patent [19]

Leshner et al.

[11] 4,064,748
[45] Dec. 27, 1977

[54] POWER INDICATING MEANS AND METHOD FOR AN INTERNAL COMBUSTION ENGINE

[75] Inventors: Ervin Leshner; Michael D. Leshner, both of Cherry Hill, N.J.

[73] Assignee: Fuel Injection Development Corporation, Bellmawr, N.J.

[21] Appl. No.: 715,836

[22] Filed: Aug. 19, 1976

[51] Int. Cl.² ............................................. G01M 15/00
[52] U.S. Cl. .................................... 73/117.3; 73/136 R
[58] Field of Search .................. 73/115, 116, 117.2, 73/117.3, 136 R

[56] References Cited

U.S. PATENT DOCUMENTS

| 2,070,842 | 2/1937 | Reichel et al. | 73/115 |
| 2,349,560 | 5/1944 | Reijnst | 73/115 |
| 3,375,711 | 4/1968 | Ives et al. | 73/115 X |
| 3,864,963 | 2/1975 | Rivere | 73/115 |

*Primary Examiner*—Charles A. Ruehl
*Attorney, Agent, or Firm*—Woodcock, Washburn, Kurtz & Mackiewicz

[57] ABSTRACT

The torque produced by an internal combustion engine is measured by algebraically combining averaged cylinder pressure with inlet manifold pressure, and manifesting the sum thereof. By multiplying the summed result by a factor representing engine speed, a direct measure of engine horsepower is obtained. The result may be displayed by an indicator or the like to provide an indication useful in operating or adjusting the engine.

15 Claims, 4 Drawing Figures

POWER INDICATING MEANS AND METHOD FOR AN INTERNAL COMBUSTION ENGINE

BACKGROUND OF THE INVENTION

The present invention relates to an approach for discovering the torque produced by an internal combustion engine, and to a means for utilizing the indication thus produced.

Even before the internal combustion engine became prevalent, users of prime moves have sought means for discovering the power output of the prime mover. Such an indication is extremely useful in properly adjusting the engine, and for operating it in a practical, economical manner. In theory, it has long been known that the power output of an engine having a movable element such as a piston could be calculated in accordance with the acronym "PLAN" wherein P represents the pressure per unit area upon the piston; L the length of the crankshaft stroke; A the area of the piston and N the speed in revolutions per minute. By ignoring the last term, the torque of the engine could be calculated.

In practice, however, making use of this simple formula has often been difficult. In the main this has been due to the practical difficulties of monitoring the internal operations of the engine. Nonetheless apparatus were developed for steam engines which monitored the differential pressure existing on either side of a piston. In effect, it was recognized that as the piston moved it compressed gaseous material either above or below it. Where the material, such as steam, drove the piston work was being done, and accordingly torque generated. However, insofar as the piston was exhausting steam from a cylinder, work was being done within the engine and accordingly a negative torque produced. Engineers recognized that by substracting one pressure from another the net work being done upon the piston could be arrived at. In this manner various sorts of instruments were devised for indicating engine work, and it became commonplace for steam engines to include mechanical devices incorporating a card and a pen for tracing a chart which could then be interpreted as indicating engine work.

With the development of the internal combustion engine, however, the problems of ascertaining engine work or power increased. In particular, the extremely high temperatures and pressures encountered in combustion chambers made it difficult to mechanically couple the chamber interiors to measuring instruments. Further in contradistinction to the steam engine, 4-cycle internal combustion engines do not provide a manifestation which can be readily interpreted as engine power. In particular, cylinder pressures during intake, compression and exhaust strokes all reflect work being done by the piston; in other words, negative engine output. Only the pressure arising during the power stroke reflected power output. Accordingly, the average pressure developed within the cylinder was practically meaningless, and it was extremely difficult to provide instrumentation which sensed only pressure arising during the power stroke.

For the foregoing reasons it has for decades been conventional to measure engine output by developing some manifestation of the actual torque outputted by the engine. This was conventionally done by means of a brake such a a Prony brake which comprised means for frictionally engaging a wheel driven by an engine. By tightening the engagement to the point of stalling the engine, the maximum torque of the engine could be read by means of a scale or the like. Then, by other means, the speed of the engine could be developed and the speed and torque figures used in order to calculate actual engine power.

In recent years the advance of technology has made it possible to couple transducers to the combustion chamber of an internal combustion engine and process the signals produced thereby. For instance, an electrical signal may be produced which reflects the instantaneous pressure within a cylinder, and other electronic means associated with the engine for determining at what point in the overall engine cycle the pressure arises. Then, by properly processing the signals together it is possible to attribute various pressures to different cycles, and accordingly to calculate the pressure arising due to work done by, and work done on, the engine. Finally, this information is processed to arrive at a figure reflecting engine torque and/or power.

It will be appreciated that it would be extremely useful to provide an indication of torque or power to be used in the adjustment or operation of internal combustion engines. However, while modern technology has made it possible to do so, there are as yet no such devices in popular use. This is due primarily to the cost involved in implementing the sophisticated electronic means which are necessary.

It is therefore an object of the present invention to provide apparatus for manifesting the torque being developed in an internal combustion engine.

Another object of the invention is to provide an economical apparatus for indicating engine power.

Another object is to provide a method for determining the torque and/or power being developed by an internal combustion engine.

SUMMARY OF THE INVENTION

Briefly stated, in accordance with one aspect of the invention the foregoing objects are achieved by providing means for receiving manifestations of combustion chamber pressure and inlet manifold pressure, and for algebraically summing the two. The summed manifestations are then taken to be an indication of actual engine torque, and may be multiplied by a factor reflective of engine speed in order to produce an indication of engine power.

In one preferred embodiment an internal combustion engine is provided with a transducer coupled to an engine cylinder and to the inlet manifold, the transducer supporting an electrical parameter which reflects the algebraic sum of the two disparate pressures. An indicator is coupled to the transducer by means of signal processing circuitry and displays an indication of engine torque output.

DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the acccompanying drawings in which:

DESCRIPTION OF A PREFERRED EMBODIMENT

Figure 1:
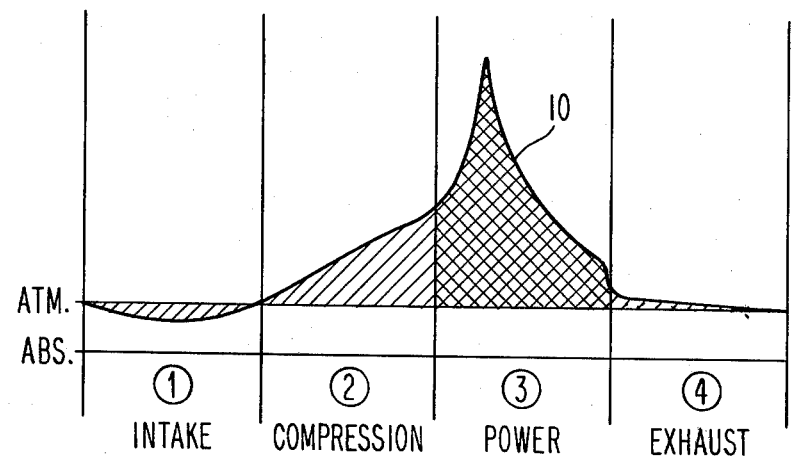
FIG. 1 is an illustration useful in understanding the operation of the present invention.

FIG. 1 illustrates the cylinder pressure within a typical internal combustion engine. It should be noted at the outset that while the term "cylinder pressure" will be used, it is recognized that the pressure arising in any expansible-chamber internal combustion engine is included within this term. Accordingly the specific configuration of the engine, whether it be reciprocating piston, reciprocating free piston, rotary or the like, are all amenable for use with the present invention. Further, while the description will proceed in terms of the operation of a 4-cycle engine, it will be recognized by those skilled in the art that the principles hereof are also adaptable for use with 2-cycle or rotary engines.

The familiar cycles of a 4-cycle engine are indicated in FIG. 1, and serially denominated intake, compression, power and exhaust. Curve 10 depicts the pressure within the cylinder at any given time, and as related to some fixed reference value such as ATM., or atmospheric pressure, or ABS., representing absolute pressure. The shaded areas beneath curve 10 represent work done by the engine upon the gases flowing through it, while the crosshatched area beneath the curve represents the work which is done upon the engine due to the combustion and subsequent expansion of fuel and air in the cylinders thereof. More particularly, the area beneath the curve for the "intake" cycle represents the work done by the engine in drawing air into the cylinder. Conventionally, this occurs as a piston moves downwardly, effectively enlarging the size of the cylinder. Of course, with a completely unrestricted cylinder no work would be required; however, due to the necessarily reduced size of intake valving, ports and the like some work is necessarily done in drawing the air into the engine. This work is often referred to by engineers as "pumping loss." The area beneath the curve for the "compression" cycle represents the work done by the engine in forcing the piston upwardly and compressing the air trapped within the cylinder. Inasmuch as this work is done by the engine, producing no net torque output, it is considered negative work. Finally, the area beneath curve 10 for the "exhaust" cycle is that work which is performed in forcing the spent gases from the cylinder. As was the case for the intake cycle, if the cylinder is completely unrestricted no work need be done. However, in fact some work is necessarily done as the piston rises in the cylinder and forces the spent gases outwardly through a valve or the like. This work is also referred to by those skilled in the art as pumping loss.

Of the four cycles depicted the only one in which work is actually done upon the engine is in the "power" cycle. As is well known, during this cycle a fuel/air mix is ignited and burns rapidly, releasing thermal energy and heating the gases within the cylinder. This causes them to expand rapidly and forces the piston downwardly, producing torque upon a crankshaft and resulting in a flow of power from the engine. Obviously, the work done upon the piston must at least equal the work done by the piston, else the engine could not operate. The excess work done upon the piston, that is, the work above that which is required to operate the engine, is available as net output, and is that power which is ordinarily measured in characterizing engine output.

To regard the foregoing argument in the graphical sense, the area beneath curve 10 for the "power" cycle must exceed the summed areas beneath the curve for all three other cycles. It will then be apparent that by graphically summing the areas under the intake, compression and exhaust cycles and subtracting them from the area beneath the "power" cycle curve one can arrive at an estimation of engine power. This is in fact analogous to a method used in which representations of engine operation were drawn upon indicator cards of steam engines, and the area thereof interpreted to devine engine power.

From the foregoing it will be apparent to those skilled in the art that, in theory at least, a transducer could be disposed within the cylinder of an internal combustion engine and a signal analogous to the curve 10 produced. By manipulating the data which is thus produced in conjunction with other signals indicating the precise timing of each cycle one might thus process the signals in order to arrive at an indication of engine torque (or power). In theory, this approach is quite sensible but in fact technical problems and economic factors have prevented if from becoming a practical approach. With the present invention, however, an approach is taken which obviates the need for sophisticated electrical or electronic timing apparatus in order to achieve a "net" pressure reading.

Figure 2:
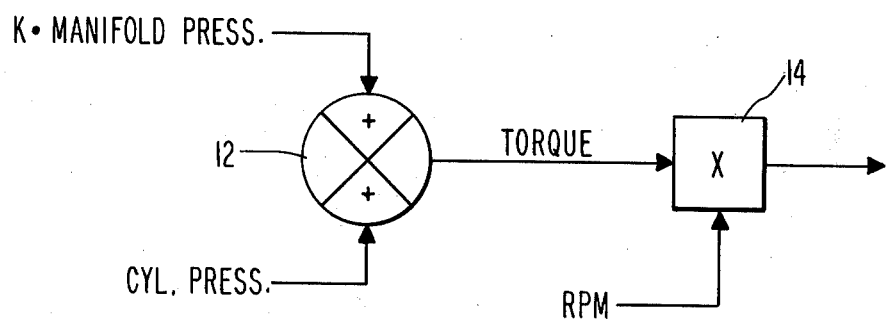
FIG. 2 is an idealized diagram illustrating principles of the present invention.

Referring now to FIG. 2, there is shown in simplified form an explanatory diagram illustrating the theory behind the present invention. In particular, a signal indicating cylinder pressure is applied to a summing node 12, along with a manifestation of inlet manifold pressure. It is anticipated that one or both of the applied signals will have been amplified or reduced, as appropriate, by some factor. Accordingly, manifold pressure is indicated as having been multiplied by some factor K to illustrate the general case. In fact, the factors which are used may depend upon the particular tranducers, amplifiers, and other components of a system which is selected. The important point is that signals representing cylinder and inlet manifold pressure are summed and the resulting signal taken to be a representation of engine torque. At any given engine RPM, the torque signal is itself extremely valuable and may be used to advantage in adjusting or "turning" an engine. Further, in multiple-engined vehicles, and particularly multiple-engined aircraft, it is of extreme value to be able to ascertain the torque of each engine independently of the others.

In order to provide a representation of the actual power being produced by the engine, the torque signal is multiplied by a speed signal, herein indicated as RPM. The signals are multiplied in a multiplier stage 14 of any appropriate type, and the resulting signal taken to be the power output of the engine. The signal may be applied to an appropriate transducer, recording device, or instrument, whose calibration will of course determine the units (such as horsepower) in which the power is displayed.

It will be readily appreciated by those skilled in the art that a knowledge of the power output of an engine is of extreme value in turning or otherwise operating upon an engine. In the modification or tuning of automobiles it has long been found desirable to place the vehicle upon a dynamometer so as to obtain a reading of engine output. Also, for diagnostic work, engine power over a range of operation is an extremely useful piece of information.

The high cost of such dynamometers along with the elaborate installation required have prohibited individuals and small businesses from obtaining them. However, the present system may readily be adapted to practically any internal combustion engine and in fact may be used in the vehicle while it is being operated. Such as instrument also finds use in multiple-engined aircraft wherein it is often difficult to determine an imbalance in power among two or more engines. In particular, under some conditions it can be difficult to ascertain whether an engine has drastically lost power or even failed. The present invention, however, provides a ready indication of actual engine power.

Considering FIGS. 1 and 2 taken together, the theory behind the present invention may be set forth. As discussed above the pressure within the cylinders of a 4-cycle internal combustion engine for three of the four cycles is the result of work being done by, rather than on, the engine. The pressure during the fourth cycle (indicated as the third cycle in FIG. 1) is work done upon the engine by the expanding combustion gases and, accordingly, it is necessary to somehow obtain the net difference between time-integrated cylinder pressures in order to make use of them in a power-indicating instrument. The conventional approach to this problem is to provide a pressure-indicating transducer coupled to the cylinder of an engine and through means of valves, switches, or the like which are operated in timed conjunction with the engine, and in effect subtract the pressure signal generated over three cycles from that of the fourth cycle. The present inventors however, have discovered that inlet manifold pressure comprises a useful analog to the time-integrated pressure within a cylinder over the intake, compression and exhaust cycles. Accordingly, manifold pressure may be subtracted from the overall, time-integrated cylinder pressure for all four cycles in order to provide an indication of net power (or torque).

The inlet manifold pressure comprises a suitable analog inasmuch as when an engine is running under load, manifold vacuum is substantially reduced. Under these conditions compression pressure is increased due to the increased volumetric efficiency of the engine. Similarly, and due to the fuller charge ingested by the cylinders, the pressure during the exhaust stroke is also raised. In essence, the shaded areas beneath the curve of FIG. 1 increase as does the area beneath the "power" cycle curve. Finding that these various pressures are proportional to inlet manifold pressures, the inventors have found that the inlet manifold pressure signal may itself be subtrated from the 4-cycle signal to provide a remainder representative of the power developed.

In the present context, whether manifold pressure is "added" or "subtrated" from cylinder pressure is purely a matter of the frame of reference chosen. If one regards the pressure in the inlet manifold as an absolute pressure it has a positive value, and accordingly must be subtrated from a positive-going cylinder pressure signal. However, it is conventional in the automotive and aircraft field to regard inlet manifold pressure as a "vacuum" or a pressure which is less than atmospheric and accordingly a "negative" pressure. Inasmuch as the transducing apparatus and the signal-summing apparatus used in a successfully-tested embodiment are designed to operate under atmospheric pressure it has been convenient to consider manifold pressure as a negative value (a vacuum) and add it to the positive-going cylinder pressure, as shown. Accordingly for purposes of cylinder pressure, as shown. Accordingly for purposes of description the signals will be described as being "added" realizing that in any given signal processing system it may be necessary to reverse the sense of one of the signals.

Figure 3:
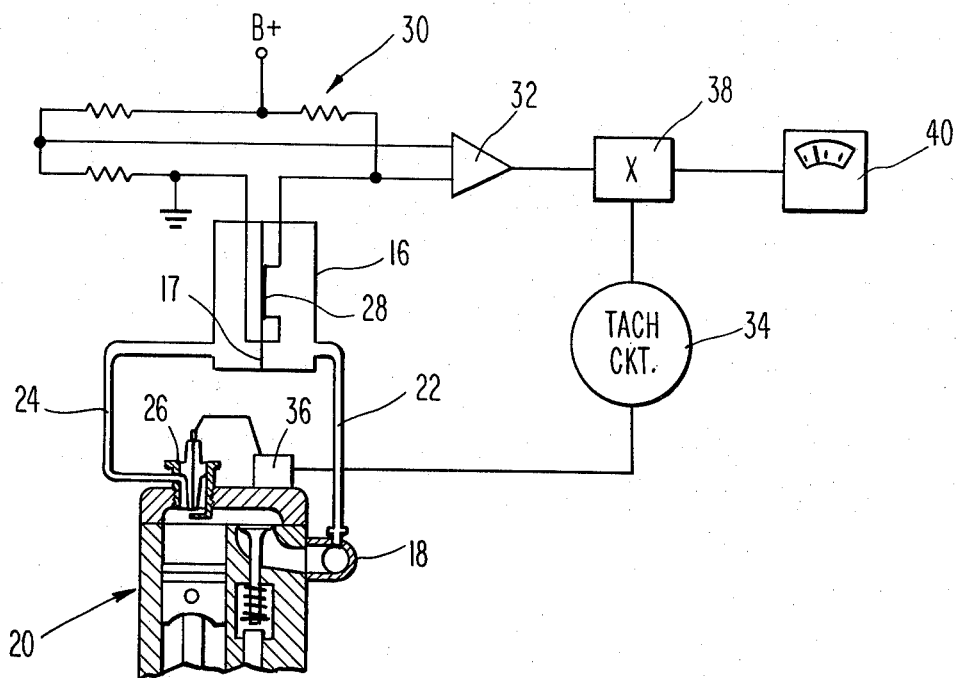
FIG. 3 is a schematic diagram showing one embodiment of the invention.

FIG. 3 is a schematic diagram showing an embodiment of the invention wherein power produced by an engine is displayed upon the scale of a meter. A chamber 16 is provided with a diaphragm 17, effectively partitioning the chamber into two areas. The right area is brought into communication with pressure within the intake manifold 18 of engine 20 through any convenient means, such as a length of tubing 22 extending to a fitting in the inlet manifold of the engine. The leftward portion of the enclosure is coupled to a source of cylinder pressure. The coupling may be achieved by running a length of tubing 24 to a small fitting coupled to the shell of sparkplug 26. The relatively small orifice provided by the cylinder pressure fitting and/or the tubing tends to integrate the cylinder pressure signal and avoid undersirable fluttering of diaphragm 17. Of course, the damping effect of the overall system, including that of diaphragm 17, also exerts an integrating effect upon the signal. Normally the manifold pressure in multiple-cyclinder engines is substantially constant over any given short period, the "integration" being accomplished by the momentum of the gases within the inlet manifold.

A variable resistor such as a strain gauge 28 is coupled to diaghragm 17, so that the resistivity thereof varies in accordance with flexure of the diaphragm. Herein it should be noted that the apportionment of the cylinder pressure to manifold pressure can easily be achieved by the expedient of differential diaphragms, or by venting one or both of the cavities of chamber 16 to the atmosphere through controlled restrictions. In any event, diaphragm 17 serves as the summing means for algebraically combining manifestations of cylinder and manifold pressure, the strain gauge resistor serving as the transducer providing an electrical signal representative of the position of the diaphragm.

Resistor 28 is incorporated in a conventional Wheatstone bridge 30. The bridge is coupled between a point of common potential such as ground, and an appropriate source of DC voltage designated B+. The voltage appearing across the resistance bridge is brought out to an amplifier 32, such as a commonly-available operational amplifier. The signal produced thereby is then a representation of torque, and may be monitored at the output of amplifier 32 if only engine torque is to be monitored. With the embodiment of FIG. 3, however, a signal is introduced representing engine speed so that power may be divined. Accordingly a tachometer circuit 34 is coupled to an appropriate point of engine 20 such as distributor 36, and produces an electrical signal which is multiplied with the output of amplifier 32 in a multiplier stage 38. Tachometer 34 may conveniently be a standard tachometer used for indicating engine RPM, and from which a speed-related signal can easily be derived. Alternatively, the "tachometer" can be a transducer which produces a speed-related signal. While pulses from distributor 36 are used in the depicted embodiment, it will be readily appreciated that any manifestation of engine speed could be substituted therefor and applied to multiplier stage 38.

The product of the torque and speed signals produced by multiplier stage 38 is then applied to the meter 40. The deflection of the needle across the face of the meter provides a ready indication of the actual power produced by the engine. Of course, other sorts of readout stages could be used such as recorders and the like; or the power-related output could be coupled to diagnostic equipment, as desired.

Figure 4:
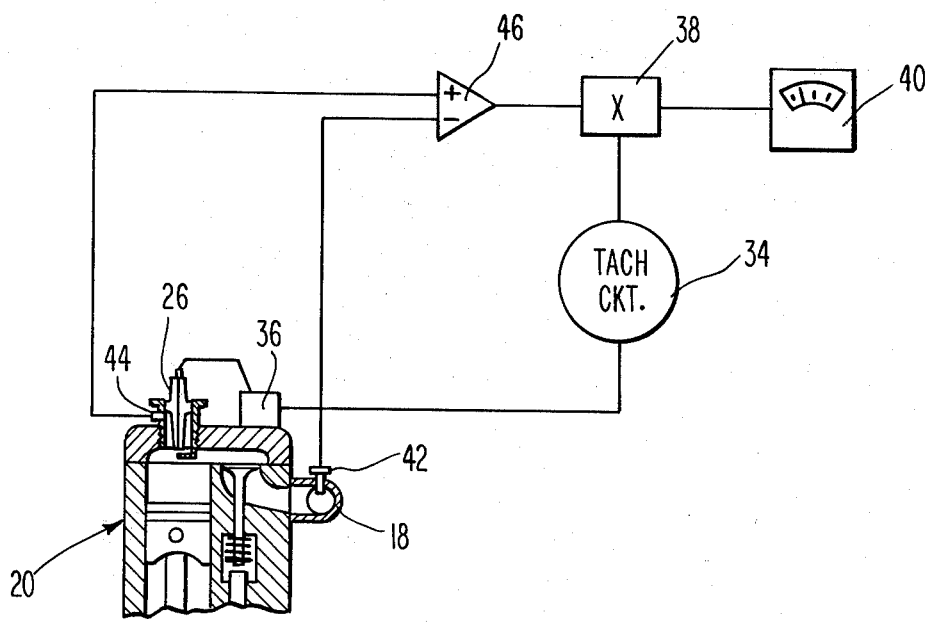
FIG. 4 is a schematic diagram showing another embodiment of the invention.

Turning now to FIG. 4, there is shown another embodiment of the inventive system, wherein elements similar to those of FIG. 3 are donated by like numerals. A signal representing the inlet manifold pressure of engine 20 is derived from a pressure transducer 42, which communicates with manifold 18. Cylinder pressure is derived through another pressure transducer 44, advantageously introduced into the outer shell of sparkplug 26 and thus in pressure communication with the engine combustion chamber. Signals from the two transducers are coupled to a summing amplifier 46, which produces an output signal representative of the algebraic sum of the transducer signals. Accordingly, amplifier 46 may be considered to be a difference or a summing amplifier, depending upon the sense of the signals. Appropriate signal proportioning means such as intermediate preamplifiers, resistive networks, etc. may be provided if necessary to vary the relative levels of the transducer signals with respect to one another.

The amplified, summed signal is then applied to indicating means 40 for displaying a representation of engine torque. In a preferred embodiment, however, the signal representative of engine speed is derived by tachometer circuit 34, and multiplied with the output of amplifier 46 in a multiplier stage 38 so as to produce a representation of engine power. In this event, meter 40 will indicate engine power rather than just torque.

It will now be seen that the present invention comprises a relatively simple, economical approach to deriving engine torque and/or power without the need for special transducers, dynamometers, or other expensive equipment. Further, inasmuch as the system is readily coupled to an internal combustion engine it may be used as a diagnostic tool or as an auxiliary meter in addition to the normal gauges used to monitor engine operation. The system may be disposed remotely from the engine in a compact module, further lending itself to easy installation and service.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Apparatus for producing an indication of the torque being developed by an internal combustion engine, comprising:
    transducer means for developing a manifestation of the algebraic sum of combustion chamber pressure and inlet manifold pressure;
    adapter means for coupling said transducer means to a combustion chamber and to the inlet manifold of the engine; and
    indicator means operatively coupled to said transducer means for receiving said manifestation and providing an indication of engine torque in response thereto.

2. Apparatus as set forth in claim 1, wherein said transducer means comprises a first transducer for producing a manifestation of combustion chamber pressure, and a second transducer for producing a manifestation of inlet manifold pressure.

3. Apparatus according to claim 2, wherein said indicator means comprises a mechanically displaceable element.

4. Apparatus according to claim 2, wherein said first and said second transducers output electrical signals representative of pressures applied thereto.

5. Apparatus according to claim 4, wherein said transducer means further includes a summing amplifier for receiving the signals outputted by said first and said second transducers and producing an output representative of the algebraic sum thereof.

6. Apparatus according to claim 5 wherein said indicator means comprises an electrical meter coupled to said summing means.

7. Apparatus as set forth in claim 1 wherein said transducer means comprises a single pressure sensitive transducer and said adapter means comprises a first pressure-transmitting channel for coupling said transducer to a combustion chamber of the engine for causing said pressure sensitive transducer to output a signal having a first sense and a second pressure-transmitting channel for coupling said transducer to the inlet manifold of the engine for causing said pressure sensitive transducer to output a signal having a second sense opposite said first sense.

8. Apparatus according to claim 1, wherein said transducer means comprises an electrical amplifier for receiving signals indicative of cylinder pressure and inlet manifold pressure and outputting the algebraic sum thereof.

9. Apparatus according to claim 1, further including tachometer means adapted to be coupled to the engine for producing a manifestation of the rate of rotation of the engine; and
    means for deriving the product of the manifestations outputted by said transducer means and by said tachometer means.

10. Apparatus according to claim 9, wherein said transducer means comprises a first transducer for producing a manifestation of combustion chamber pressure, and a second transducer for producing a manifestation of inlet manifold pressure.

11. Apparatus according to claim 9, wherein said transducer means comprises a single pressure sensitive transducer and said adapter means comprises a first pressure-transmitting channel for coupling said transducer to a combustion chamber of the engine for causing said pressure sensitive transducer to output a signal having a first sense, and a second pressure-transmitting channel for coupling said transducer to the inlet manifold of the engine for causing said pressure sensitive transducer to output a signal having a second sense opposite said first sense.

12. Apparatus according to claim 11, wherein said pressure sensitive transducer serves to output an electrical signal.

13. The method of producing an indication of the torque being developed by an internal combustion engine, comprising the steps of:
    deriving a first manifestation of pressure arising within a cylinder of the engine;

deriving a second manifestation of pressure arising in the inlet manifold of the engine; and continuously algebraically summing said first and second manifestations to obtain the difference therebetween said difference comprising an indication of torque.

14. The method according to claim 13, further including the step of displaying said indication of the algebraic sum of said second manifestations.

15. The method according to claim 13, further including the steps of deriving a third manifestation of engine speed; and multiplying the algebraic sum of said first and said second manifestations by said third manifestation to obtain a signal representative of engine power.

* * * * *

UNITED STATES PATENT AND TRADEMARK OFFICE
CERTIFICATE OF CORRECTION

PATENT NO. : 4,064,748

DATED : December 27, 1977

INVENTOR(S) : Ervin Leshner; Michael D. Leshner

It is certified that error appears in the above-identified patent and that said Letters Patent are hereby corrected as shown below:

Col. 1, line 11, "moves" should be --movers--.

Col. 4, line 47, "turning" should be --tuning--.

Col. 4, line 64, "turning" should be --tuning--.

Col. 5, line 8, "as" should be --an--.

Col. 5, line 53, "subtrated" should be --subtracted--.

Col. 5, line 56, "subtrated" should be --subtracted--.

Col. 5, lines 59-60, "subtrated" should be --subtracted--.

Col. 6, lines 2-3, the following should be deleted:
  "Accordingly for purposes of cylinder pressure, as shown."

Col. 6, lines 27-28, "cyclinder" should be --cylinder--.

Col. 10, line 2, after "said" should be inserted:
  --first and said--.

Signed and Sealed this

Ninth Day of May 1978

[SEAL]

Attest:

RUTH C. MASON
Attesting Officer

LUTRELLE F. PARKER
Acting Commissioner of Patents and Trademarks